J. E. STRIETELMEIER.
NUT LOCK.
APPLICATION FILED NOV. 29, 1912.
1,084,566.
Patented Jan. 13, 1914.
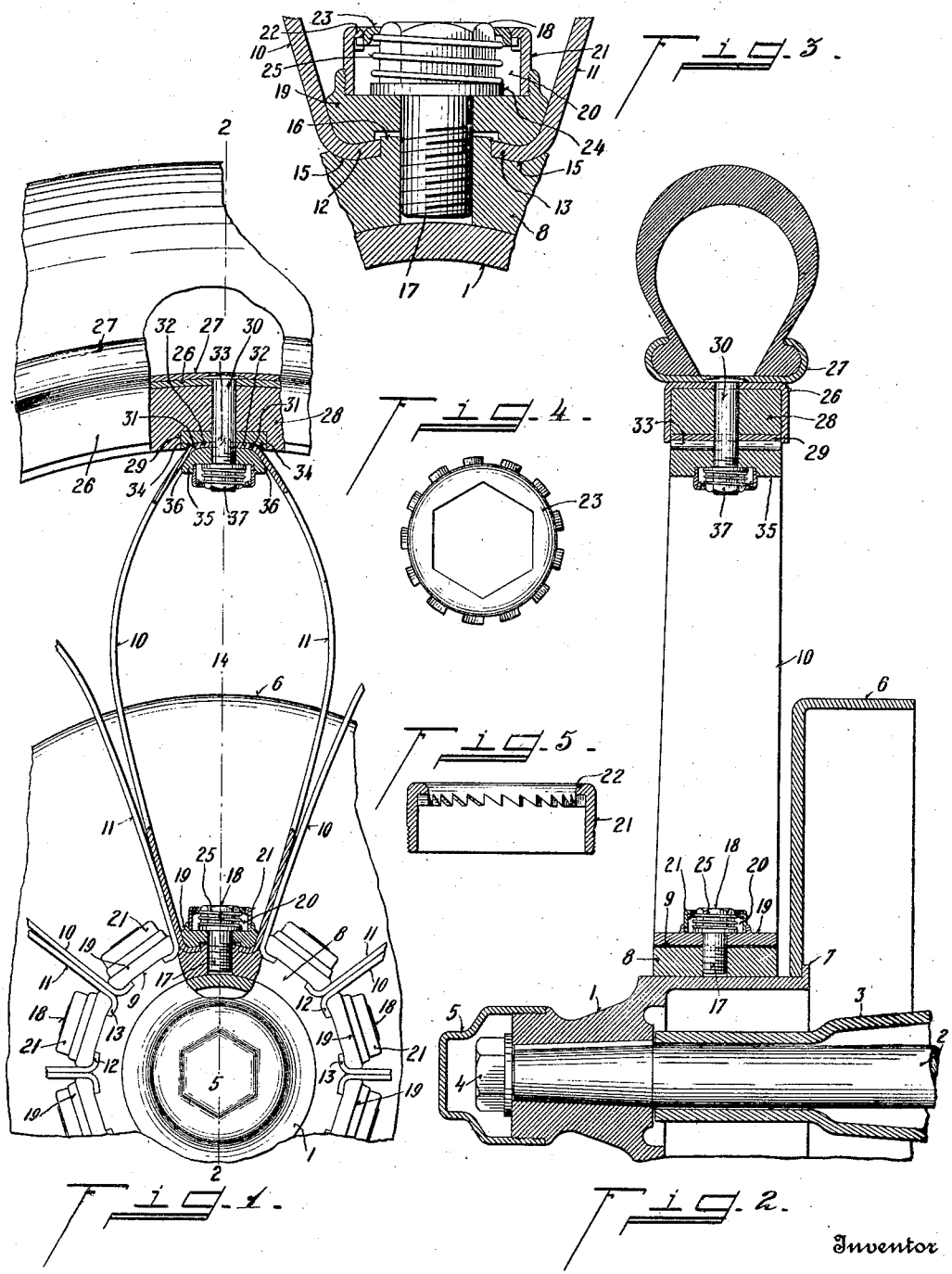

UNITED STATES PATENT OFFICE.

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

NUT-LOCK.

1,084,566.  Specification of Letters Patent.  Patented Jan. 13, 1914.

Application filed November 29, 1912. Serial No. 734,122.

*To all whom it may concern:*

Be it known that I, JOHN E. STRIETEL-MEIER, a citizen of the United States, residing at Cincinnati, in the county of Hamilton and State of Ohio, have invented certain new and useful Improvements in Nut-Locks, of which the following is a specification.

This invention relates to improvements in the construction of nut locks, and it also deals with certain unique securing devices advantageously applicable in connecting the spokes of wheels to the rim or hub thereof.

One object within the contemplation of this invention is to provide a fastening means operable by a wrench, that will be dust and mud proof and which will perform the office of retaining the connection without becoming loosened, even under the excessive intermittent strains and vibrations to which a wheel is ordinarily subject.

A further object is to design a simple, yet effective arrangement, whereby the spoke springs my be connected to the hub or rim by means of nuts or bolts, as the case may be, and to conceal the sharp edges of the polygonal surfaces thereof, while at the same time providing for pull and instantaneous accessibility of the same through a suitable socket wrench.

Other objects will be in part indicated in the following specification and in part rendered obvious from the accompanying drawings.

This invention accordingly, consists in the features of construction, arrangements of parts herein more particularly described, and in the extent of modification and range of equivalency indicated by the accompanying claims.

To facilitate the disclosure of this invention to those skilled in this art, it will suffice to expose the underlying essentials by way of one embodiment thereof and to that end drawings of the form now preferred have been annexed and will be described in detail, and in such drawings like characters of reference denote corresponding parts throughout all the views, of which:—

Figure 1 is a fragmentary elevation, partly in section, of a spring wheel embodying the features of invention herein disclosed and claimed. Fig. 2 is a vertical axial section taken along line 2—2, of Fig. 1. Fig. 3 is an enlarged detail section of a portion of the hub and spoke connection. Fig. 4 is a top plan view of the nut locking plate. Fig. 5 is a section of the nut closure cap.

Referring to Figs. 1 and 2, numeral 1 indicates a wheel hub, which is here shown keyed to the tapered end of a driving axle 2, which is in turn mounted in suitable bearings in a conventional housing 3, said hub being retained by a suitable nut 4. A cap 5 may also be employed for the purpose of covering the nut 4. On the hub 1 may be arranged a brake drum 6 secured thereto in any suitable manner, as by having a tight driving fit thereon, and further retained by means of a suitable annular flange 7.

Rigid with the hub 1, or otherwise firmly secured thereto, is a part 8 shown in fragmentary section by Fig. 1, and having a suitably contoured periphery 9 against which are seated the laterally bent sections or end flanges of the flat springs forming elements of the spokes of the wheel. Each spoke as an entity is of a petal-shape and is composed of two springs 10 and 11 respectively, the hub ends of which are provided with inturned flanges 12, 13, that extend toward one another, but which preferably terminate with parallel edges short of the radial center line 14 of the petal-like spoke, as appears more clearly by Fig. 1. To accommodate these flanges (which may depart from the spring proper by a rounded curve) the periphery of the member 8 preferably is provided with counter recesses, as indicated by 15, and, between the parallel end-edges of the spring flanges, the member 8 preferably also provides a ridge or low plateau 16, which is preferably centrally apertured to receive the threaded shank of a retaining bolt 17, having a head 18. For the purpose of securing these springs to the hub member 8, I have devised a novel organization having the two-fold capacity of protecting the heads of the retaining bolts against mud and keeping them in a clean condition, adapted for the instantaneous application of a socket wrench, and at the same time preventing the parts from working loose under the excessive vibrations to which the wheels are necessarily subject. This instrumentality is unique with me, and the use herein described will indicate the wide field to which it is applicable.

A member 19, that may be denominated a clamping member, is constructed, or so related with respect to the member on which it is mounted, as to be restrained against rotation relative to that member which in this instance is the member 8. Thus, the part 19 here assumes the form of an elongated rectangle having its bottom surface contoured to interfit with flanges 12, 13, of the springs 10 and 11 respectively, and bridge the ridge 16, and its sides preferably converge toward the axis of the wheel so as to have a proper clamping relation with the radial portions of the springs immediately adjacent the hub, as will be understood from the drawings. This straddle member 19 is apertured to receive the shank of the bolt 17, and it provides a chamber 20 for the head 18 of such bolt. This chamber may conveniently be formed by means of a cup-like stamping 21 that is attached to the member 19, as by means of threads that are left-handed when the bolt threads are right-handed, or vice versa, so as to permit the stamping 21 to be turned only in a direction opposite to that affording a removal of the bolt 17. This stamping has a circular opening in its top that is bordered by an inturned edge 22. Within this opening is a depressible plate 23, having a hexagonal opening interfitting the head 18 of the bolt. Intervening between the inturned edge 22 and the adjacent rim of the plate 23 is a means for restraining relative rotation between these parts, such as ratchet teeth, so that when the plate 23 is in the normal position, indicated by Fig. 1, it will be impossible for the bolt 17 to unscrew, without also turning the stamping 21, which, however, is impossible by reason of the character of its connection with the part 19. Within the chamber 20, and preferably carried by a flange or washer 24, is an expansible spring 25 that serves to keep the plate 23 in the normal position shown. When, however, it is desired to unscrew the bolt 17, to enable the part 19 to be removed, a socket wrench is applied to the head of the bolt, and the plate 23 readily yields longitudinally of the slot before the advance of this wrench so that it soon becomes disengaged from the ratchet teeth of member 21 and the bolt may be unscrewed without interference.

The drawings also indicate another somewhat modified advantageous application of my unique attaching instrumentality, whereby the outer extremities of the spring members are secured to the rim of the wheel. Referring to the drawings, 26 indicates a wheel rim constructed of channel-iron and on which is mounted a rim portion 27, that receives the tire. Interfitting within the rim 26 is a wooden filling 28. At the point of attachment for each petal-like spoke, a bearing member 29 of brass or other relatively soft metal is countersunk, or otherwise suitably secured to the filling member 28, and a bolt 30 is non-rotatably secured to the bottom of the channel rim 26, or to the filling 28, and extends centrally through the plate 29. The outer surface of this plate 29 will be contoured in accordance with the construction of the springs secured thereby. Thus, in this instance, these springs are so bent as to enter into attachment with the rim at an angle of about 30°, and at the point of initial contact with the bearing plate 29, such springs are preferably rounded, as indicated by 31, and thereafter, portion 32 extends preferably tangentially with the inner periphery of the rim and terminates in a reversely bent clencher edge 33, that is received by a corresponding channel in the block 29. It may be noted that the curve 34 of the block 29 is less abrupt than that normally provided by the spring, to leave a slight space therebetween and provide for a certain amount of flexing of the spring, so as to prevent bending over a sharp edge and reducing crystallization. A saddle block 35 is arranged in the crotch formed by the springs 10 and 11, and is contoured accordingly and provides rounded edges 36, affording gradual flexing surfaces for the springs. This block 35 carries nut-locking features similar to those described in the foregoing, but in this instance, the nut 37 directly engages the screw threaded end of the non-rotatable bolt 30.

It will thus be perceived that this invention is well adapted to achieve the objects and advantages indicated in the foregoing and the features disclosed are capable of wide use and may readily be modified to meet the requirements of different purposes.

The terms nut and bolt have been employed in an alternative sense, inasmuch as the elements are structurally interchangeable as appears from the drawings.

To explain the manner in which I prefer to use the invention herein claimed, it has been necessary to reveal certain novel features of a spring-wheel structure all claims for which are reserved for another application.

Having described my invention, I claim:—

1. A structure of the nature disclosed combining a supporting member, a detachable coöperating member, a screw threaded retaining device for drawing said members together, said device comprising a polygonal rotatable head mounted on said detachable member, a spring pressed locking plate interfitting with said polygonal head, and means rigid with said detachable member for normally restraining rotation of said locking plate, the latter being adapted to be released from said means by a movement toward said detachable member.

2. A structure of the nature disclosed combining a permanently mounted part, a detachable member providing an open chamber, a screw threaded part rotatably mounted in said chamber and adapted to be operated by a wrench, a guard plate slidably interfitting with said part and adapted to interlock with said member when in outer position, and a spring normally retaining said member in its interlocking position.

In testimony whereof, I have hereunto set my hand.

JOHN E. STRIETELMEIER.

Witnesses:
OLIVER B. KAISER,
EMMA SPENER.